US012704815B2

(12) United States Patent
Ummel

(10) Patent No.: US 12,704,815 B2
(45) Date of Patent: *Aug. 11, 2026

(54) DEWAR DEVICE FOR WATCH

(71) Applicant: OMEGA SA, Biel/Bienne (CH)

(72) Inventor: Antoine Ummel, Neuchâtel (CH)

(73) Assignee: OMEGA SA, Biel/Bienne (CH)

( * ) Notice: Subject to any disclaimer, the term of this patent is extended or adjusted under 35 U.S.C. 154(b) by 311 days.

This patent is subject to a terminal disclaimer.

(21) Appl. No.: 18/540,491

(22) Filed: Dec. 14, 2023

(65) Prior Publication Data

US 2024/0210888 A1 Jun. 27, 2024

(30) Foreign Application Priority Data

Dec. 23, 2022 (EP) .................................... 22216515

(51) Int. Cl.

| | |
|---|---|
| ***G04B 43/00*** | (2006.01) |
| ***G04B 37/02*** | (2006.01) |
| ***G04G 9/00*** | (2006.01) |
| ***G04G 17/08*** | (2006.01) |

(52) U.S. Cl.

CPC ........... *G04B 43/005* (2013.01); *G04B 37/02* (2013.01); *G04G 9/0017* (2013.01); *G04G 17/08* (2013.01)

(58) Field of Classification Search

None

See application file for complete search history.

(56) References Cited

U.S. PATENT DOCUMENTS 3,030,763 A * 4/1962 Klingenberg .......... G04B 37/02 368/291
3,740,944 A * 6/1973 Chopard .............. G04B 43/005 368/286
2019/0304399 A1* 10/2019 Suenaga .................. G09G 5/10
2022/0180614 A1 6/2022 Staton et al.
2022/0390900 A1* 12/2022 Willemin ............... G04B 19/32

FOREIGN PATENT DOCUMENTS

| | | | |
|---|---|---|---|
| CH | 716 914 | A2 | 6/2021 |
| EP | 3 163 360 | A2 | 5/2017 |
| EP | 3 163 360 | A3 | 6/2017 |
| EP | 4 012 512 | A1 | 6/2022 |
| JP | 52-40766 | U | 3/1977 |
| JP | 4-316085 | A | 11/1992 |
| JP | 2020-76772 | A | 5/2020 |
| JP | 2022-91696 | A | 6/2022 |

OTHER PUBLICATIONS

European Search Report for EP 22 21 6515 dated Jun. 7, 2023.

* cited by examiner

*Primary Examiner* — Edwin A. Leon
*Assistant Examiner* — Matthew Daniel Hwang
(74) *Attorney, Agent, or Firm* — Sughrue Mion, PLLC

(57) ABSTRACT

A Dewar device (1) for mechanical and/or functional components 5 of a watch (10), comprising a casing (2) provided with an enclosure (4) wherein a case (12) of said watch (10) can be removably arranged, said case being provided with a display device capable of displaying information relating to time indications or to functions implemented by the watch (10), said display device being arranged opposite a crystal (6) of said casing (2), the Dewar device (1) comprising a system (3) for dynamically adjusting the contrast of the display device of the watch (10) comprising said variable luminosity crystal (6) and a control unit (8) configured to control the contrast of said display device of the watch (10).

11 Claims, 1 Drawing Sheet

DEWAR DEVICE FOR WATCH

CROSS REFERENCE TO RELATED APPLICATIONS

This application is claims priority to European Patent Application No. 22216515.1, filed on Dec. 23, 2022, the disclosures of which are incorporated by reference herein their entireties

TECHNICAL FIELD OF THE INVENTION

The invention relates to a Dewar device for mechanical and/or functional components of a watch, the device comprising a system for dynamically adjusting the contrast of a display device such as a watch dial arranged in a casing of said Dewar device.

TECHNOLOGICAL BACKGROUND

An electronic watch conventionally comprises a bracelet and a watch case including several electrical or electronic components. It is known in the prior art that some of these components cannot withstand extreme temperatures, and cease to operate correctly at these temperatures.

Under these conditions, there is then a need to be able to use a watch, particularly an electronic watch, in environments where such extreme temperatures may prevail, and in particular to be able, in the context of this use, to read accurately and efficiently the information present on the display device of such a watch.

SUMMARY OF THE INVENTION

To this end, the invention relates to a Dewar device for mechanical and/or functional components of a watch, comprising a casing provided with an enclosure wherein a case of said watch can be removably arranged, said case is provided with a display device capable of displaying information relating to time indications or to functions implemented by the watch, said display device being arranged opposite a crystal of said casing, the Dewar device comprising a system for dynamically adjusting/regulating the contrast of the display device of the watch, the system comprising said variable luminosity crystal and a control unit configured to control the contrast of said display device of the watch.

In other embodiments:

- said crystal comprises a luminosity/lighting variation element which is transparent;
- the control unit is connected via a connecting element to the element for varying the luminosity of the crystal;
- the crystal comprises a transparent substrate, a lower surface of which comprises a luminosity variation element;
- the crystal comprises a transparent substrate comprising a luminosity variation element which is comprised in the body of said substrate;
- the substrate is formed by two layers of transparent material, between which layers the luminosity variation element consisting of a stack of transparent functional layers of organic electroluminescent materials is disposed;
- the control unit comprises at least one event sensor, said event being capable of causing a variation in luminosity in the outer environment of said Dewar device, said sensor being a luminosity sensor;

- the element for varying the luminosity of the crystal is a lighting element, in particular a transparent lighting element of the OLED type;
- the Dewar device comprising a reversible fixing device fixing said watch case in said enclosure while keeping it away from functional elements forming this enclosure comprising a middle part, a back and a variable luminosity crystal of this casing;
- said enclosure is under vacuum or near-vacuum;
- the crystal has a surface that is substantially greater than or strictly greater than that of a watch case crystal.

BRIEF DESCRIPTION OF THE FIGURES

Other features and advantages will be clear from the description which is made hereinafter, in an indicative and a non-limiting manner, with reference to the appended figures, wherein.

DETAILED DESCRIPTION OF THE INVENTION

Figure 1:
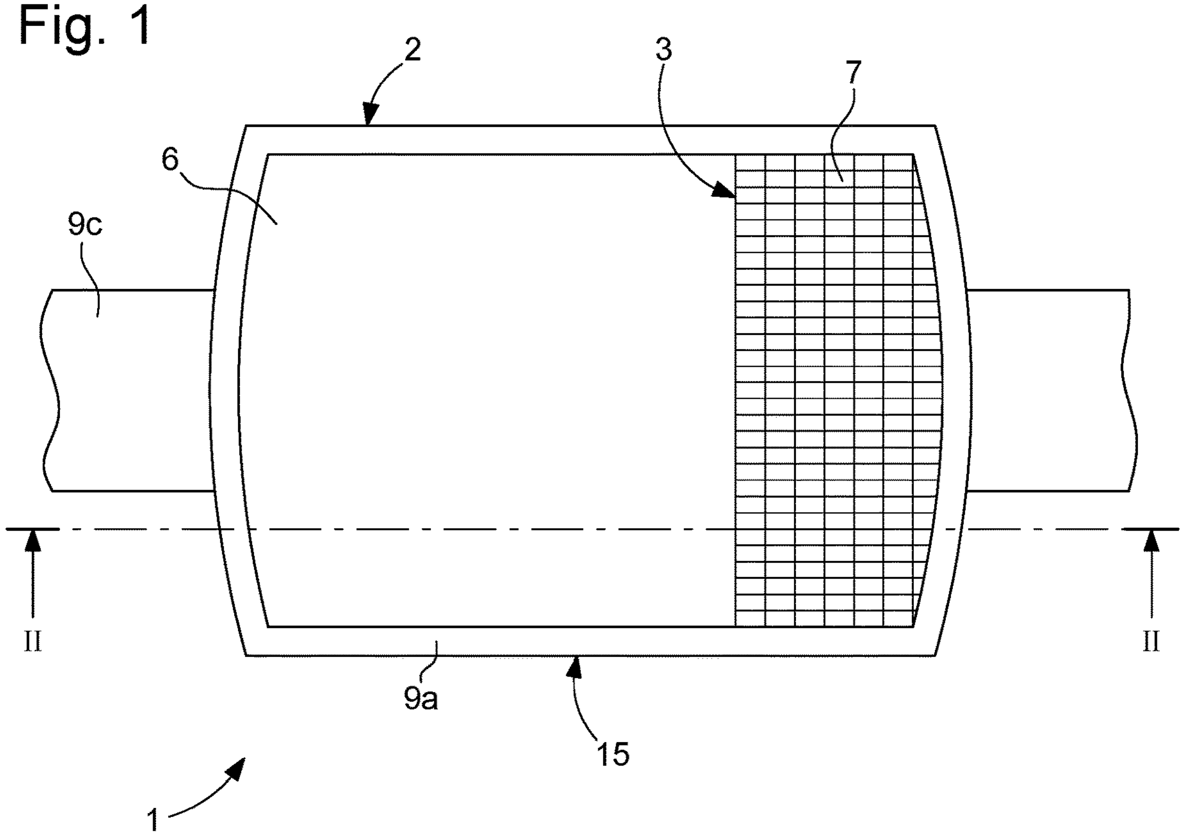
FIG. 1 is a schematic representation of a top view of a Dewar device comprising a casing provided with a crystal comprising an element for varying the luminosity of the display device of a watch arranged in this casing, according to embodiments of the invention.
Figure 2:
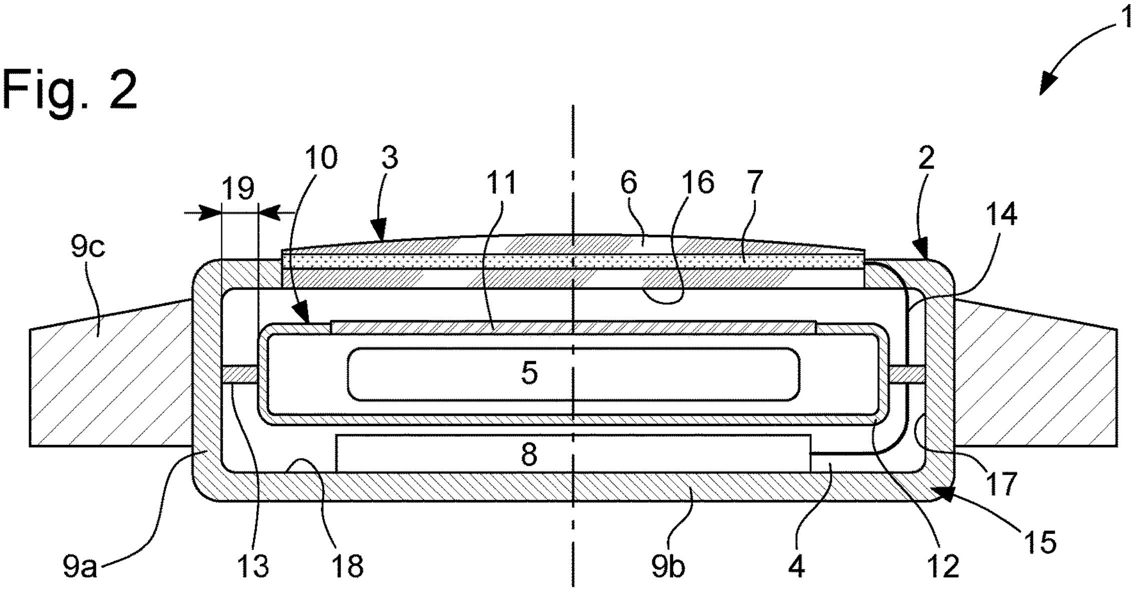
FIG. 2 is a sectional view along the axis II-II of the schematic representation of the watch in FIG. 1, according to the embodiments of the invention.

FIGS. 1 and 2 show a watch Dewar device 1 for mechanical and/or functional components 5 of a watch 10. This watch Dewar device 1, also called "isothermal watch device" or, more simply, a "Dewar device", comprises a thermal protection casing 2, also called an "isothermal casing" or a "Dewar casing". Such a thermal protection Dewar device 1 for mechanical and/or functional components 5 of a watch 10, is able to provide good thermal insulation for mechanical and/or functional components 5 of the watch 10, a case 12 of which must be arranged in an enclosure 4 of this casing 2 in order to provide such thermal insulation for these components 5. In other words, this casing 2 is formed in particular by the combination of its functional elements 15 with the case 11 of the watch 10 in order to provide suitable thermal insulation for these mechanical and/or functional components 5. These functional elements 15 of the casing 2 forming this said enclosure 4 comprise a crystal 6, an inner peripheral wall 17 of a middle part 9*a* and a back 9*b* of this casing 2. In this configuration, the watch 10 case is arranged in an enclosure 4 while being kept away from or at a distance from the functional elements 15 of the casing 2 forming this said enclosure 4. Note that this inner peripheral wall 17 of the middle part is also that of said enclosure 4.

In this Dewar Device 1, the casing 2 comprises a system 3 for dynamically adjusting the contrast of a display device such as a watch 10 dial. Such a system 3 helps to automatically configure the contrast of the display device. Such a contrast adjustment allows to improve the legibility of the information displayed by this display device by taking into account the luminosity present in the environment of the Dewar device 1. In particular, it will be noted that this system 3 allows an optimum contrast to be configured between one or more graphic representations relating to the information, and their respective backgrounds.

For this purpose, this system 3 comprises the crystal 6 of the casing 2, which is a transparent crystal 6 with variable luminosity oriented towards the display device of the watch 10, and a control unit 8 connected to this crystal 6 which is configured to control/manage this luminosity.

In this context, the control unit 8 includes an electronic circuit comprising a controller provided with hardware resources, in particular at least one processor cooperating with memory elements as well as data and control address buses, and also an energy accumulator otherwise called a battery. This control unit 8 comprises in its memory elements an algorithm for managing the dynamic contrast adjustment of the watch 10 display device. Such an algorithm is executed by the processor of this control unit 8, taking account in particular of data from event sensors comprised in the control unit 8 in order to ensure management of the contrast of this display device. It should be noted that such data may, for example, provide information relating to events detected by these sensors, said events being likely to contribute to/lead to/generate a variation in the ambient luminosity prevailing in the environment of the Dewar device 1 and which may disturb/alter the reading of information present on/in the display device. These events may comprise, in a non-limiting and non-exhaustive manner: the detection of a particular level of luminosity in the environment of the Dewar device 1 in particular solar radiation, etc.

In this context, the event sensor comprises in particular and in a non-limiting and non-exhaustive manner a luminosity sensor comprising a solar radiation sensor and/or an infrared solar radiation sensor and/or an ultraviolet solar radiation sensor.

It should be noted that the event sensor forms part of the control unit 8 and is connected to the controller of this unit. The luminosity sensor is disposed in the casing 2 and in particular in at least one of the functional elements 15 of this casing 2 so as to be exposed to the light coming from the environment outside the Dewar device 1 and therefore the casing 2. By way of example, this luminosity sensor can be arranged in the body of the crystal 6 of the casing 2 and/or on an inner face 16 of this crystal 6.

In this Dewar device 1, the control unit 8 comprises a substrate such as a flexible PCB on which its electronic circuit is arranged, with the exception of the luminosity sensor which may be comprised in the crystal 6 or on the inner face of this crystal 6 of the casing 2. In this context, the circuit can be built on this substrate using three-dimensional printing methods or polymer printing methods. It should be noted that this substrate is arranged in the enclosure 4 on one of the functional elements 15 such as the back 9*b* or on the inner peripheral wall 17 of the enclosure 4.

As mentioned above, the control unit 8, and in particular its controller, is linked/connected to the crystal 6 of the casing 2 via a connection element 14. Such a crystal 6 is formed by a substrate and a transparent luminosity/lighting variation element 7 arranged in or on this substrate. This substrate is made of a material such as glass, such as mineral glass, acrylic glass, optical ceramic or sapphire glass. In this crystal 6, such a luminosity variation element 7 is, for example, is a transparent lighting element, in particular an organic light-emitting diode lighting element known by the acronym OLED.

Such an OLED-type lighting element includes a stack of transparent functional layers comprising layers of organic electroluminescent materials supplied with electricity by transparent electrodes, generally in the form of first and second electrically conductive layers, of this stack, flanking this/these layer(s) of material(s). Such a lighting element 7 of the OLED type can be designed to emit polychromatic radiation defined at 0° by coordinates (x1, y1) in the CIE XYZ 1931 colorimetric diagram, coordinates therefore given for normal radiation. This transparent lighting element 7 is configured to emit light radiation in the direction of the display device or directed towards the display device.

In a non-limiting and non-exhaustive manner, electroluminescent layers can comprise small molecules, known as SM-OLEDs (Small Molecule Organic Light Emitting Diodes), or polymers, known as PLEDs (Polymer Light Emitting Diodes).

In a first variant of the crystal 6 of the casing 2, the luminosity variation element 7 is arranged/applied/printed/deposited on a lower surface of the substrate, thus forming the inner face 16 of this crystal 6.

In a second variant of the crystal 6 of the casing 2, the luminosity variation element 7 is comprised in the body of the substrate forming this crystal 6 of the casing 2. In this context, this substrate can be formed by two layers of transparent material such as glass, between which layers, the luminosity variation element 7 is disposed.

It should be noted that the presence of the luminosity variation element 7 in or on the substrate comprised in the crystal 6 does not alter the transmittance properties of this crystal 6 of the casing 2.

In this context, it is therefore understood that the control unit 8, by controlling/managing the variation of an electrical voltage applied to the first and second electrically conductive layers of the luminosity variation element 7, allows to vary the illumination/light intensity applied to the display device, and in particular the distribution of the illumination/light intensity on this display device. In this way, the control unit 8 is then able to configure a contrast of the display device which is adapted to the surrounding luminosity, with a view to facilitating reading of this display device and/or providing reading comfort for the user of this Dewar device 1.

This variation in this lighting generated by the luminosity variation element 7, otherwise called variation in light intensity, takes place between two states. A first state relating to maximum light intensity and a second state relating to zero light intensity.

Moreover, as previously mentioned, the watch 10 case 12 is arranged in the casing 2 of this Dewar device 1 while being away from or maintained at a distance 19 or else at a spacing 19 from the inner peripheral wall 17 of the enclosure 4, thanks to the reversible fixing device 13 of the casing 2. In other words, such a fixing device 13 is capable of configuring a spacing 19 between said case 12 and functional elements 15 of the casing 2 forming said enclosure 4. In this configuration, the fixing device 13 helps to reduce or even eliminate any heat conduction between the inner peripheral wall 17 of the middle part 9*a* (or of the enclosure 4) and/or the back 9*b* and/or the crystal 6 with the watch 10 case 12, in particular with an outer overall face of this case 12. This outer overall face includes an upper face comprising the crystal 11 of the case 12 of this watch 10, a lower face comprising a back of said case 12 and an outer peripheral wall of a middle part of this case 12.

In this configuration, the fixing device 13 for reversibly fixing the watch 10 case 12 to the inner peripheral wall 17 of the enclosure 4 of the casing 2 may comprise:

- connecting members each having first and second ends capable of connecting respectively to the watch 10 case 12 and to the inner peripheral wall 17 of the enclosure 4 of this casing 2. The body of each member has a particular structure which helps to reduce heat loss to the outer environment of the casing 2 of the Dewar device 1 and therefore to ensure a stable internal temperature in the watch 10 case 12, and/or connecting members configured to ensure magnetic levitation of said watch 10 case 12 in said enclosure 4. Indeed, these connecting members are configured to ensure and maintain a spacing 19 between said case 12 and the functional elements 15 forming said enclosure 4 of the casing 2. Such connecting members help to reduce or even eliminate any heat conduction between the inner peripheral wall 17 of the middle part 9*a* and/or the back 9*b* and/or the crystal 11 with the watch 10 case 12, in particular with an outer overall face of this case 12.

Note that the case 12 is comprised in a watch 10, which may be an electronic watch, such as a quartz watch, or a mechanical or electromechanical watch.

The above-mentioned mechanical and/or functional components 5 of the watch 10 comprise, in a non-limiting and non-exhaustive manner: a horological movement, a display device such as a dial, hands, rings, joints and/or electronic and/or electrical components. It will be noted in particular that such electronic and/or electrical components include, for example, a display device, a processor, a memory, an energy storage component, a motor, an integrated circuit and an electronic oscillator, etc.

In this context, this device 1 therefore comprises the casing 2 which includes the middle part 9*a* on which a bracelet 9*c* is mounted allowing a user of this Dewar device 1 to wear it. This casing 2 also includes the aforementioned crystal 6 and back 9*b*. In this device 1, it will be noted that the crystal 6 preferably comprises a surface that is substantially greater than or strictly greater than a crystal 11 of the watch 10 case 12. In other words, the inner face 16 of the crystal 6 has a surface that is substantially greater than or strictly greater than or equal to that of an upper face of the crystal 11 of the watch 10.

As seen, the functional elements 15 such as the crystal 6, the middle part 9*a* and the back 9*b* of this device 1 together define the enclosure 4 of this casing 2 which is capable of accommodating the watch 10 case 12. These three elements 15 of the casing 2, namely the middle part 9*a*, the crystal 6 and the back 9*b*, may be separate elements which are joined together to construct this enclosure 4. Alternatively, the middle part 9*a* and the back 9*b* of the casing 2 may together form a one-piece part, said one-piece part defining an opening opposite the back 9*b* which is capable of being closed by the crystal 6 in a reversible and hermetically sealed manner. Alternatively, the middle part 9*a* and the crystal 6 of the watch 10 casing 2 can together form a one-piece part, said one-piece part defining an opening opposite the crystal 6 which can be closed by the back 9*b*, also reversibly and in a sealed and hermetic manner.

The middle part 9*a* and the back 9*b* are preferably made, in a non-limiting and non-exhaustive manner, of a metallic material, glass or thermosetting or thermoplastic polymer resins reinforced with carbon or crystal fibres, or else ceramic materials. It should be noted that when the middle part 9*a* and the back 9*b* are transparent or semi-transparent, being made of glass for example, the inner peripheral wall 17 of the middle part 9*a* and the inner face 18 of the back 9*b* may be coated with a metallic or similar reflective coating, such as a layer of silver for example.

Furthermore, in this device, when the watch 10 case 12 is arranged in the enclosure 4 of the casing 2, the space defined between this case 12 and the inner peripheral wall 17 of the middle part 9*a*, the back 9*b* and the crystal 6 is empty or almost empty of material. In other words, the enclosure 4 is under vacuum or near-vacuum.

It is therefore understood that in this configuration, this Dewar device 1 has the same properties and features as a Dewar tube/vessel well known in the prior art. As already mentioned, the properties and features of this Dewar device 1 help to give it good thermal insulation with regard to the extreme temperatures that may prevail in the outer environment wherein such a device 1 may be located.

In addition, it should be noted that the mechanical and/or functional components 5 of the watch 10 may be non-magnetic and/or that the casing 2 of the watch 10 may be made of a material or be covered with a coating enabling these components to be insulated from magnetic fields.

Furthermore, the fixing device 13 helps to dispose the watch 10 case 12 in this casing 2 so that the crystal 11 of this watch 10 case 12 is arranged facing the crystal 6 of the casing 2 so that the information comprised on the dial and/or the display interface of this watch 10 can be perceived through the transparent crystal 6 of the casing 2 by the user wearing the Dewar device 1.

Thus, such a Dewar device 1 provides the mechanical and/or functional components 5 of the watch 10 with very good thermal insulation from the outer environment, reducing or even preventing heat loss by radiation from the components arranged in the watch 10 case 12 over a long period of time. Thus, when the temperature outside the device 1 reaches extreme values, typically of the order of −125 to +125° C., the temperature inside the enclosure 4 remains substantially equal to the temperature present in the watch 10 case 12 when it arranged in the casing 2, typically around 20° C. It should be noted that regardless of the temperature conditions prevailing in the environment of the Dewar device 1, the temperature present in the watch 10 case 12 is a temperature which does not hinder the correct operation of the watch 10. This temperature is maintained over a period which is 2 to 18 times longer than the period during which such a watch 10 case 12 would be capable of maintaining the operating temperature of its components when located directly in such an environment where such temperatures prevail, in particular extreme temperatures (that is to say when located outside the casing 2 of the Dewar device 1. It is thus conceivable that such a configuration allows to protect the mechanical and/or functional components 5 of the watch 10, as well as helping to ensure that they operate optimally in extreme external temperature conditions.

It goes without saying that the present invention is not limited to the embodiments just described and that various simple modifications and variants may be considered by the person skilled in the art without departing from the scope of the invention as defined by the appended claims.

The invention claimed is:

1. A Dewar device (1) for mechanical and/or functional components (5) of a watch (10), comprising:

a casing (2) provided with an enclosure (4) wherein a case (12) of said watch (10) can be removably arranged, said case being provided with a display device capable of displaying information relating to time indications or to functions implemented by the watch (10), said display device being disposed opposite a variable luminosity crystal (6) of said casing (2); and a system (3) for dynamically adjusting the contrast of the display device of the watch (10), the system (3) comprising said variable luminosity crystal (6) and a control unit (8) configured to control the contrast of said display device of the watch (10).

2. The device (1) according to claim 1, wherein said crystal (6) comprises a luminosity variation element (7) which is transparent.

3. The device (1) according to claim 2, wherein the control unit (8) is connected via a connecting element (14) to the luminosity variation element (7) for varying the luminosity of the crystal (6).

4. The device (1) according to claim 1, wherein the crystal (6) comprises a transparent substrate, a lower surface of which includes a luminosity variation element (7).

5. The device (1) according to claim 1, wherein the crystal (6) comprises a transparent substrate including a luminosity variation element (7) which is provided in a body of said substrate.

6. The device (1) according to claim 5, wherein the substrate is formed by two layers of transparent material, and wherein the luminosity variation element (7) is disposed between the two layers of transparent material, the luminosity variation element including a stack of transparent functional layers of organic electroluminescent materials.

7. The device (1) according to claim 1, wherein the control unit (8) comprises at least one event sensor for sensing a variation in luminosity in an outer environment of said Dewar device (1).

8. The device (1) according to claim 1, wherein the crystal (6) comprises a luminosity variation element (7) which is transparent, the luminosity variation element (7) of the crystal (6) being a lighting element, including a transparent lighting element of the OLED type.

9. The device (1) according to claim 1, wherein said watch case (12) is fixed in said enclosure (4) in such a way as to maintain the watch case away from functional elements (15) forming the enclosure (4), the enclosure comprising a middle part (9*a*), a back (9*b*) and a variable luminosity crystal (6) of this casing (2).

10. The device (1) according to claim 1, wherein said enclosure (4) is under vacuum or near-vacuum.

11. The device (1) according to claim 1, wherein the crystal (6) has a surface that is substantially greater than or strictly greater than that of a crystal (11) of the watch case (10).

* * * * *